US012120397B2

(12) United States Patent
Fukuda et al.

(10) Patent No.: US 12,120,397 B2
(45) Date of Patent: *Oct. 15, 2024

(54) VIDEO DISTRIBUTION SYSTEM, VIDEO DISTRIBUTION METHOD, INFORMATION PROCESSING DEVICE, AND VIDEO VIEWING PROGRAM

(71) Applicant: GREE, INC., Tokyo (JP)

(72) Inventors: Takumi Fukuda, Tokyo (JP); Soichiro Takakuwa, Tokyo (JP)

(73) Assignee: GREE, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/373,039

(22) Filed: Sep. 26, 2023

(65) Prior Publication Data

US 2024/0015365 A1 Jan. 11, 2024

Related U.S. Application Data

(63) Continuation of application No. 17/957,557, filed on Sep. 30, 2022, now Pat. No. 11,805,299, which is a (Continued)

(30) Foreign Application Priority Data

| Jun. 28, 2019 | (JP) | 2019-120762 |
| Aug. 5, 2019 | (JP) | 2019-143497 |
| May 1, 2020 | (JP) | 2020-081090 |

(51) Int. Cl.
*H04N 21/478* (2011.01)
*G06T 13/40* (2011.01)
(Continued)

(52) U.S. Cl.
CPC ......... *H04N 21/4781* (2013.01); *G06T 13/40* (2013.01); *H04N 21/44204* (2013.01);
(Continued)

(58) Field of Classification Search
CPC ......... H04N 21/4781; H04N 21/44204; H04N 21/44218; H04N 21/4532; H04N 21/4784; H04N 21/8146; G06T 13/40
See application file for complete search history.

(56) References Cited

U.S. PATENT DOCUMENTS 11,496,807 B2    11/2022   Fukuda et al.
11,805,299 B2 *   10/2023   Fukuda ............... G06T 13/40
(Continued)

FOREIGN PATENT DOCUMENTS

JP    2003-255964 A    9/2003
JP    2012-093734 A    5/2012
(Continued)

OTHER PUBLICATIONS

Oct. 1, 2019 Office Action issued in Japanese Patent Application No. 2019-120762.
(Continued)

*Primary Examiner* — Kyu Chae
(74) *Attorney, Agent, or Firm* — Oliff PLC

(57) ABSTRACT

An information processing device displays a video including an avatar object on a display based on video data received from a server, displays a group to which a distributing user belongs in an identifiable manner in a video view or a video distribution list including images of multiple videos, and sends a display request to display an object in one of the videos to the server.

12 Claims, 13 Drawing Sheets

Related U.S. Application Data continuation of application No. 16/883,080, filed on May 26, 2020, now Pat. No. 11,496,807.

(51) Int. Cl.
   *H04N 21/442* (2011.01)
   *H04N 21/45* (2011.01)
   *H04N 21/4784* (2011.01)
   *H04N 21/81* (2011.01)

(52) U.S. Cl.
   CPC ... *H04N 21/44218* (2013.01); *H04N 21/4532* (2013.01); *H04N 21/4784* (2013.01); *H04N 21/8146* (2013.01)

(56) References Cited

U.S. PATENT DOCUMENTS

| | | | |
|---|---|---|---|
| 2013/0291037 A1* | 10/2013 | Im | H04N 21/64707 725/109 |
| 2013/0344966 A1 | 12/2013 | Mustafa | |
| 2014/0267544 A1 | 9/2014 | Li et al. | |
| 2014/0325392 A1 | 10/2014 | Gossweiler, III | |
| 2016/0300387 A1* | 10/2016 | Ziman | G06F 3/165 |
| 2017/0374391 A1 | 12/2017 | Akagawa et al. | |
| 2019/0088153 A1* | 3/2019 | Bader-Natal | H04N 7/147 |
| 2020/0077157 A1 | 3/2020 | Kurabuchi | |
| 2020/0380486 A1 | 12/2020 | Wright | |

FOREIGN PATENT DOCUMENTS

| | | |
|---|---|---|
| JP | 2014-512199 A | 5/2014 |
| JP | 2014-171869 A | 9/2014 |
| JP | 2014-217627 A | 11/2014 |
| JP | 2014-219443 A | 11/2014 |
| JP | 2015-184689 A | 10/2015 |
| JP | 2015-191205 A | 11/2015 |
| JP | 2015-223514 A | 12/2015 |
| JP | 2016-143332 A | 8/2016 |
| JP | 2016-202550 A | 12/2016 |
| JP | 6378850 B1 | 8/2018 |
| JP | 2019-022072 A | 2/2019 |
| JP | 2019-023846 A | 2/2019 |
| JP | 6526934 B1 | 6/2019 |
| JP | 6550549 B1 | 7/2019 |

OTHER PUBLICATIONS

Oct. 23, 2019 Office Action issued in Japanese Patent Application No. 2019-143497.

* cited by examiner

Fig.2A

| User ID | Distribution History | View History | Coin | Point |
|---|---|---|---|---|
| 0011 | *** | *** | 1000C | 1000pt |
| 0012 | *** | *** | 500C | 2000pt |
| : | : | : | : | : |

Fig.2B

| User ID | Object Identification Information | Attachment | Attachment Part |
|---|---|---|---|
| 0011 | Headwear | Allowed | Head |
| | T-shirt | Allowed | Upper Body |
| | Cat Ears | Allowed | Head |
| | : | : | : |

Fig.2C

| User ID | Object Identification Information | Quantity | Coin |
|---|---|---|---|
| 0011 | Ring | 1 | *** |
| : | Hanging Scroll | 2 | *** |
| | : | : | : |

Fig.2D

| Team | User ID | Total Viewing Time | Number of Distribution Days | 1st Accumulated Point (Free Gift) | 2nd Accumulated Point (Paid Gift) |
|---|---|---|---|---|---|
| A | 0011 | *** | *** | 500pt | 2000pt |
| | 0020 | *** | *** | 1000pt | 600pt |
| | : | : | : | : | : |
| B | : | : | : | : | : |

VIDEO DISTRIBUTION SYSTEM, VIDEO DISTRIBUTION METHOD, INFORMATION PROCESSING DEVICE, AND VIDEO VIEWING PROGRAM

This application is a continuation of U.S. application Ser. No. 17/957,557 filed Sep. 30, 2022, which is a continuation of U.S. Ser. No. 16/883,080 filed May 26, 2020, claiming the benefit of priority from Japanese Patent Application No. 2019-120762 filed Jun. 28, 2019, Japanese Patent Application No. 2019-143497 filed Aug. 5, 2019, and Japanese Patent Application No. 2020-081090 filed May 1, 2020, the entire contents of the prior applications being incorporated herein by reference.

BACKGROUND

1. Field

The following description relates to a video distribution system, a video distribution method, an information processing device, and a video viewing program.

2. Description of Related Art

Referring to Japanese Laid-Open Patent Publication No. 2015-184689, a known video distribution system creates an animation of a character object based on movement (motion) of an actor and distributes a video including the created animation.

In such a video distribution system, an object may be displayed in the video by operation of a viewing user. The viewing user may display, for example, a gift object that is sent to the character object in the video.

In a video distribution system such as that described above, as real-time interaction becomes more active between a distributing user distributing a video and viewing users viewing the video, there is a tendency to increase the number of users viewing the video and the length of viewing time or the number of times the video is viewed. Therefore, there is a demand for distribution of a video that facilitates interaction between a distributing user and viewing users.

SUMMARY

It is an objective of the present disclosure to facilitate interaction of a user distributing a video with viewing users of the video.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a video distribution system including circuitry is provided. The circuitry is configured to detect movement of a distributing user that distributes a video, transmit movement information based on the detected movement to a server, display an image on a display based on video data received from the server, send a display request to display an object in the video to the server, generate video data including an avatar object based on the movement information, store the distributing user in association with a group, and transmit evaluation information in which the group is evaluated based on the display request with respect to the group.

In another aspect, a method for distributing a video is provided. The method includes, by circuitry of a video distribution system, detecting movement of a distributing user that distributes a video, transmitting movement information based on the movement detected to a server, displaying an image on a display based on video data received from the server, sending a display request to display an object in the video to the server, generating video data including an avatar object based on the movement information, storing the distributing user in association with a group, and transmitting evaluation information in which the group is evaluated based on the display request with respect to the group.

In another aspect, an information processing device including circuitry is provided. The circuitry is configured to display a video including an avatar object on a display based on video data received from a server, display a group to which a distributing user belongs in an identifiable manner in a video view or a video distribution list including images of multiple videos, and send a display request to display an object in one of the videos to the server.

In another aspect, a non-transitory computer readable medium that stores a video viewing program is provided. The video viewing program, when executed by circuitry, causes the circuitry to display a video including an avatar object on a display based on video data received from a server, display a group to which a distributing user belongs in an identifiable manner in a video view or a video distribution list including images of multiple videos, and send a display request to display an object in one of the videos to the server.

Other features and aspects will be apparent from the following detailed description, the drawings, and the claims.

BRIEF DESCRIPTION OF THE DRAWINGS

FIGS. 2A to 2D respectively show user management information, possession list information, gift object information, and event information that are stored in the server shown in FIG. 1.

FIG. 7A is a viewing view. FIG. 7B is a viewing view displayed when a gift button is operated. FIG. 7C is a viewing view displaying gift objects.

The present disclosure, together with objects and advantages thereof, may best be understood by reference to the following description of the presently preferred embodiments together with the accompanying drawings.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A first embodiment of a video distribution system will now be described with reference to FIGS. 1 to 10.

Figure 1:
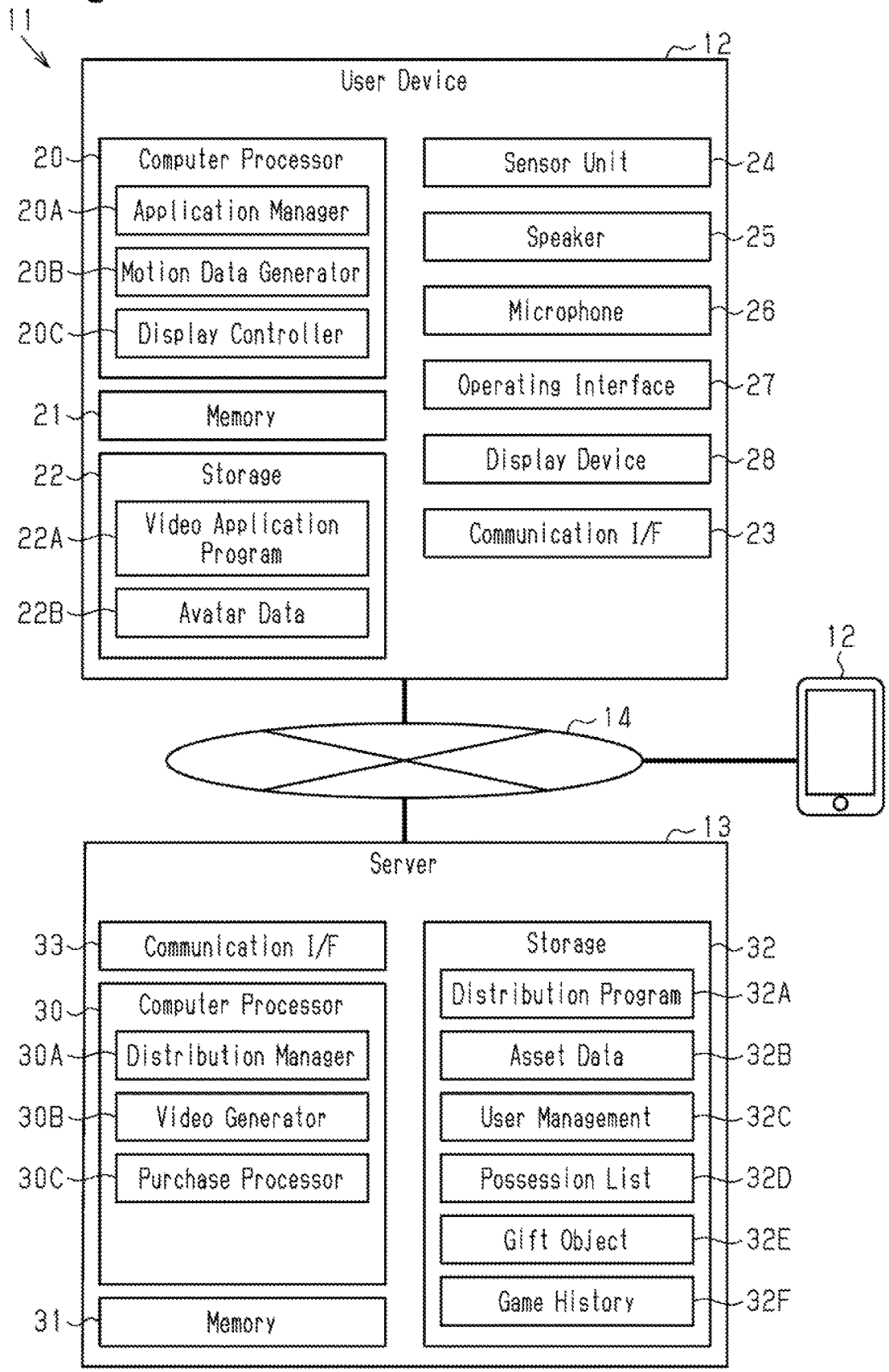
FIG. 1 is a schematic diagram showing a first embodiment of a video distribution system.

As shown in FIG. 1, a video distribution system 11 includes multiple user devices 12 and a server 13. In the video distribution system 11, a user uses a user device 12 to distribute a video including an avatar object corresponding to the user to another user device 12 of another user via the server 13. A video application program is installed on the user devices 12 so that a video is viewed and distributed. Hereafter, a user distributing a video is referred to as a "distributing user." A user viewing a video distributed by the distributing user is referred to as a "viewing user." When there is no distinction between the distributing user and the viewing user, a user is simply referred to as a "user." When not distributing a video, a distributing user may become a viewing user viewing a video distributed by another distributing user. The user device 12 corresponds to a distribution device and a viewing device.

User Device

The user device 12 may be, for example, a smartphone (multifunctional phone terminal), a tablet terminal, a personal computer, a game console, a wearable computer such as a head-mounted display, or other information processing devices configured to play a video.

The user device 12 includes a computer processor 20, memory 21, storage 22 (storage medium), and a communication interface (UF) 23. The computer processor 20 is an arithmetic unit that loads an operating system and various programs on the memory 21 from the storage 22 or other storage and executes an instruction retrieved from the memory 21. The computer processor 20 is one or more arithmetic circuits such as a central processing unit (CPU), a graphic processing unit (GPU), and a neural network processing unit (NPU). The communication OF 23 is configured to exchange data with the server 13 and other user devices 12 through a network 14. The network 14 includes various types of networks such as a local area network and the Internet. The communication I/F 23 is implemented as hardware, software, or a combination of these.

The memory 21 is a primary storage device (storage medium) directly readable and writable by the computer processor 20 and is, for example, semiconductor memory. The storage 22 is an auxiliary storage device (storage medium) and is, for example, a magnetic disk, an optical disk, semiconductor memory, or other storage medium. Multiple storages may be combined and used as the storage 22. The storage 22 stores a video application program 22A, avatar data 22B used for drawing an avatar object, and other information used for executing the video application program 22A. The video application program 22A includes a video distribution program and a video viewing program and switches between a distribution mode in which the user distributes a video and a viewing mode in which the user views a video distributed by another distributing user in accordance with an instruction of the user. The avatar data 22B is three-dimensional model data used to create a three-dimensional animation. The user device 12 obtains the avatar data 22B from the server 13 at a predetermined point in time. The avatar data 22B includes, for example, skeleton data and mesh data following the skeleton data and rendering the avatar object. The avatar data 22B is model data configured to move at least a head, an eye, a mouth, and hair of the avatar object.

The user device 12 includes a sensor unit 24, a speaker 25, a microphone 26, an operating interface (UF) 27, and a display device 28. At least one of the sensor unit 24, the speaker 25, the microphone 26, the operating OF 27, or the display device 28 may be provided in the same device as the computer processor 20 or may be provided separately from the computer processor 20. The sensor unit 24 corresponds to a detector. The display device 28 corresponds to a display.

The sensor unit 24 is a sensor group configured to detect a change in expressions of the user (including blinking or opening and closing of mouth), motion of the head, and a change in the position of the user relative to the sensor unit 24. The sensor unit 24 includes, for example, at least one of a set including an emitter that emits infrared light toward the user and an infrared camera that detects the infrared light reflected from, for example, the face of the user or a set including a camera that captures an image of the face of the user and an image processor that performs an image processing on data of the image captured by the camera. The sensor unit 24 may be a sensor other than those described above. Alternatively, in addition to the sensors described above, for example, an acceleration sensor or a gyro sensor may be combined into the sensor unit 24.

The speaker 25 converts sound data into sound and outputs the sound. The microphone 26 converts voice input by the user into sound data. The operating OF 27 is, for example, a touchscreen integrated with the display device 28, an operating button provided on a casing of the user device 12, a keyboard, a mouse, or a controller. The display device 28 outputs various types of image in accordance with an output instruction of the computer processor 20.

The computer processor 20 executes the video application program 22A stored in the storage 22 to be used as an application manager 20A, a motion data generator 20B, and a display controller 20C. The application manager 20A manages the video application program 22A. The application manager 20A sends a request to the motion data generator 20B or the display controller 20C in accordance with a request received from the operating OF 27 or the server 13. In addition, the application manager 20A sends a request from the motion data generator 20B and the display controller 20C to the server 13 and stores various types of data received from the server 13 in the storage 22. The application manager 20A corresponds to a movement information transmitting portion and a request sender. The motion data generator 20B corresponds to a movement detector. The display controller 20C corresponds to a first display controller, a second display controller, and an identification information display.

The motion data generator 20B obtains detection data of expressions of the user, motion of the head, and the position of the user relative to the sensor unit 24 from the sensor unit 24. The motion data generator 20B applies the obtained detection data to the avatar data 22B to generate motion data.

In the distribution mode, the display controller 20C displays a video in accordance with data received from the server 13 while displaying the avatar object to which the detection data is applied. In the distribution mode, the display controller 20C may combine video data created by the display controller 20C with data received from the server 13 and output a video to the display device 28 in accordance with the combined data. Alternatively, the display controller 20C may receive the entire data for displaying a video from the server 13 and output the video to the display device 28 in accordance with the data. When a video is not distributed or viewed, the display controller 20C retrieves image data from the storage 22 and displays various types of view on the display device 28 in response to a request from the application manager 20A. A case in which such views are displayed includes, for example, when the distributing user edits the avatar object of the distributing user and when the setting of the video application program is configured. In the viewing mode, the display controller 20C uses video data received from the server 13 to play a video. The display controller 20C may play a data file that has been downloaded and stored in the storage 22 from the server 13 or may perform a streaming play that plays a video while receiving data from the server 13.

Server

The server 13 will now be described. For example, the server 13 is used by a service provider that provides a platform service for distributing a video. The server 13 may include, for example, a computer processor 30, memory 31, and storage 32, and a communication OF 33. The computer processor 30 has a configuration similar to that of the computer processor 20 of the user device 12. The computer processor 30 may be configured by a combination of arithmetic circuits. The memory 31, the storage 32, and the communication OF 33 have configurations similar to those of the user device 12. The server 13 may be configured by multiple devices. The computer processor 30, the memory 31, the storage 32, and the communication OF 33 may be separately arranged in the devices.

The storage 32 stores a distribution program 32A. The computer processor 20 executes the distribution program 32A to be used as a distribution manager 30A, a video generator 30B, and a purchase processor 30C. The distribution manager 30A corresponds to a group registration portion, a calculation portion, and an evaluation portion.

The distribution manager 30A stores various types of data received from the user device 12 in the storage 32 and sends requests to the video generator 30B and the purchase processor 30C based on requests received from the user devices 12. The distribution manager 30A also receives requests from the video generator 30B and the purchase processor 30C and sends the requests to the user devices 12. More specifically, in response to a request from the user device 12, the distribution manager 30A sends a list of videos that are currently distributed. When receiving identification information of a video requested from the user device 12, the distribution manager 30A distributes video data generated by the video generator 30B to the user device 12 that has issued the request. The distribution manager 30A also distributes the entire video data generated by the video generator 30B or part of video data, such as a message posted to the video or data of an object requested to be displayed, to the user device 12 of the distributing user. Thus, the distributing user can see the message and the object that is requested to be displayed on the screen of the user device 12.

The video generator 30B includes a physics engine. The video generator 30B uses motion data of the avatar object received from the user device 12 of the distributing user to generate a video including sound and images in a virtual space. In addition, the user device 12 of the viewing user sends requests to the video generator 30B to display an object in the video being viewed and to display a message. The video generator 30B executes processes in accordance with the requests. The object requested to be displayed is an object displayed in the virtual space and includes a gift object provided from the viewing user to the distributing user. Although not necessary, the viewing user may have to pay for sending a request to display a gift object. Alternatively, when the gift object is displayed in response to the display request, the viewing user may pay the cost.

In addition, the video generator 30B executes a process for displaying a message received from the user device 12 in the video. The message includes, for example, identification information of the viewing user (e.g., account name of user) and the posted date and time in addition to the content of the message.

The purchase processor 30C executes an object purchase process in accordance with operation of the user. The purchase process includes exchanging, selling, and transferring of an object in addition to purchasing of compensation (medium) such as coins that are usable in the video application program, purchasing of an object by paying compensation such as coins to obtain a paid object, and obtaining of a free object. The free object may be completely free of compensation or may be exchangeable with points obtained by viewing a video. The purchase processor 30C stores the purchased object as a possession of the user in the server 13. The sales of purchasable objects are divided to, for example, the distributing user and the service provider.

Various types of data stored in the storage 32 of the server 13 will now be described. The storage 32 stores asset data 32B, user management information 32C, possession list information 32D, gift object information 32E, and event information 32F.

The asset data 32B is data used to draw a virtual space configuring a video. More specifically, the asset data 32B includes, for example, data used to draw a background of the virtual space, audio data such as sound effect, three-dimensional model data (object model data) used to draw various types of object displayed in the video, and texture data.

The object model data includes data of objects that are distinguished based on modes in which users use the objects. More specifically, the object model data includes data of an object that is displayed by the distributing user and data of a gift object that is provided from the viewing user to the distributing user. The gift object includes an effect object, an attachment object, and a normal object. The effect object affects the impression of the entire view of the distributed video and is, for example, an object imitating confetti or an object imitating firework. The attachment object is associated with a particular part of an avatar object and displayed in the view. The attachment object is, for example, an accessory attached to the avatar object (e.g., hat or cap, glasses, cat ears), apparel (e.g., T-shirt), costume, or an object attachable to another avatar object. The attachment object is provided from the viewing user and then selected by the distributing user, so that the attachment object is attached to an avatar object. The normal object is a gift object excluding the attachment object and disposed as an object in the virtual space. The normal object is, for example, an object imitating plush or bouquet.

The user management information 32C will now be described with reference to FIG. 2A. The user management information 32C is stored for each user. The user management information 32C includes identification information of the user (user ID), video distribution history of the user, and video viewing history of the user. The user management information 32C also includes information related to a coin and a point. The coin is a medium that is purchasable by the user and usable in the video application program or the platform service providing the video application program. The coin may be exchanged with an object such as a gift object or another medium usable in the video application program. The point includes, for example, a viewing bonus point assigned to a user when the user views a video. In the description, when a medium usable in the video application program is not distinguished from an object locatable in a virtual space, the medium and the object are referred to as "elements."

The possession list information 32D will now be described with reference to FIG. 2B. The possession list information 32D is stored for each user. The possession list information 32D includes identification information of the user (user ID) and object identification information of a possession object that can be displayed on a video distributed by the user. The possession object is, for example, a hat, a T-shirt, or cat ears. The possession list information 32D also includes information indicating whether the possession object is attachable to the avatar object and an attachment part. When the possession object is the attachment object, that is, when the possession object is attachable to the avatar object, the attachment part is information indicating which part of the avatar object the attachment object is attachable to. The user may use an object included in the possession list information 32D of the user in a video distributed by the user. The possession list information 32D may include the number of objects that are possessed.

The gift object information 32E will now be described with reference to FIG. 2C. The gift object information 32E is stored for each user. The gift object information 32E includes identification information (user ID) of the distributing user, object identification information of a gift object, the number of gift objects, and identification information (user ID) of a viewing user serving as a provision user that has requested to display a gift object. The gift is an element of the video application program usable in an object or the video application program. For example, when a user has a gift object in the gift object information 32E and another distributing user is distributing a video, it may be configured so that the user is allowed to request that the gift object be displayed on the video or be provided to the distributing user but is not allowed to use the gift object in a video distributed by the user. In this case, when a user obtains a gacha point by lot and exchanges the gacha point with a gacha ticket, the user is not allowed to use the gacha ticket. At this time, the gift object information 32E associated with the user includes identification information of the gacha ticket.

The event information 32F will now be described with reference to FIG. 2D. The event information 32F relates to history of a team match event held in the video distribution service. For each team, the event information 32F includes identification information of users belonging to the team. For each user, the event information 32F includes the length of viewing time, the number of distribution days, first accumulated points based on free gift objects, and second accumulated points based on paid gift objects. The first accumulated points are accumulated when a free gift object is requested to be displayed in the video. A predetermined amount of points may be added to the first accumulated points for each free gift object regardless of the type of free gift object. Alternatively, different points may be assigned in accordance with the type of free gift object. For example, when the gift object is a star stamp, one point may be assigned. When the gift object is firework, five points may be assigned. When a paid gift object is requested to be displayed in the video, the second accumulated points are accumulated in accordance with, for example, compensation for the paid gift object. For example, as more coins or other media are needed to obtain a paid gift object, more points may be assigned to the second accumulated points. A distributing user to which a large amount of first accumulated points and second accumulated points are assigned has a tendency to have a large number of viewing users, who are dedicated fans of the distributing user (for example, viewing user that provides a lot of gift objects to the distributing user).

The length of viewing time (total length of viewing time) is the accumulated total of time for which a video distributed by the distributing user has been viewed during the period of the event. For example, it is assumed that when a video is distributed for the first time during the period of the event, viewing user A viewed the video for twenty minutes, viewing user B viewed the video for fifteen minutes, and viewing user C viewed the video for ten minutes. In the first distribution, the length of time the video is viewed is 45 minutes. "45 minutes" is registered to the event information 32F as the length of viewing time. When the length of time the video is viewed for the second time during the period of the event is 100 minutes, "100 minutes" is added to the length of viewing time (45 minutes) in the event information 32F, and the length of viewing time becomes 145 minutes. The length of viewing time of a distributing user has a tendency to increase when there is a large number of at least one of viewing users who interacted with the distributing user in the past, viewing users who are friends with the distributing user, or viewing users who view a video distributed by the distributing user a number of times, that is, "repeaters." More specifically, when such a distributing user starts to distribute a video, viewing users who are related with the distributing user view the video regardless of the number of gift objects.

The number of distribution days indicates the number of days on which the distributing user distributes a video during the period of the event. A distributing user having a large number of "distribution days" includes a user who continues to distribute a video even without having repeaters or fans. Such a distributing user is, for example, a user who has just started distributing a video.

Figure 3:
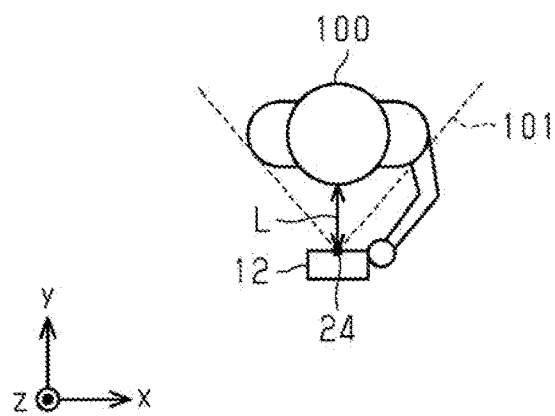
FIG. 3 schematically shows the positional relationship between a user and a user device in a real space in the first embodiment.

The positional relationship between the distributing user and the user device 12 will now be described with reference to FIG. 3. In the description, the user device 12 used to distribute a video and the user device 12 used to view a video are embodied in smartphones. The distributing user 100 faces the user device 12 so that at least the face of the distributing user 100 is included in a detection range 101 of the sensor unit 24, and runs a distribution application program. At this time, the distributing user 100 sets the distribution application program to the distribution mode. When the distributing user 100 operates to start distribution in the distribution mode, motion data is sent from the user device 12 to the server 13. During the distribution of a video, the video of a virtual space including an avatar object is displayed on the display device 28 of the user device 12 of the distributing user 100. The point of view of the video is located on the position of the sensor unit 24. The position of the avatar object changes in accordance with the relative distance between the distributing user 100 and the sensor unit 24. For example, when the distributing user 100 moves away from the sensor unit 24 in the Y-direction in FIG. 3 and a relative distance L between the distributing user 100 and the user device 12 is increased, the change in the relative distance L is reflected on the position of the avatar character in the virtual space, and the avatar character moves in a rearward direction in the view.

Figure 4:
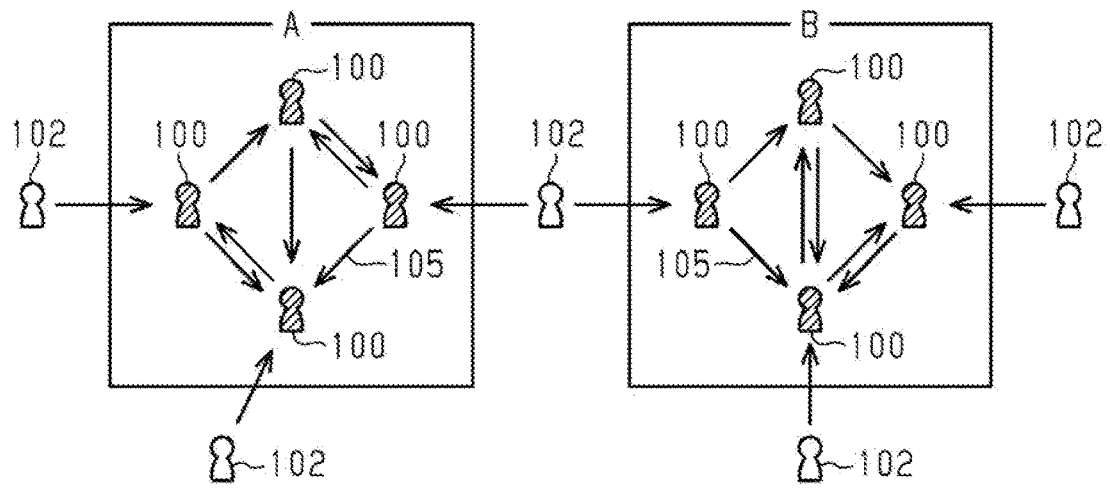
FIG. 4 is a schematic diagram illustrating a team match event in the first embodiment.

The team match event in the video distribution service will now be described with reference to FIG. 4. A distributing user 100 participating in the team match event belongs to one of the two teams. A viewing user 102 viewing the video issues a display request 105 to request that a gift object be displayed in the video as indicated with arrows in FIG. 4. Also, the distributing user 100 may act as a viewing user who views a video distributed by other distributing users 100 and issue the display request 105 of an object to the other distributing users 100.

On condition that a request for displaying a gift object is issued or that a gift object is displayed in a video, the server 13 adds predetermined points to the accumulated points stored in the event information 32F associated with the distributing user 100 who distributes the video. Thus, the accumulated points are updated. In addition, the server 13 calculates the total value of the accumulated points of the distributing users 100 belonging to each team. Further, among the distributing users 100 belonging to each team, the server 13 calculates the total of accumulated points of a predetermined number of distributing users 100 having higher accumulated points (e.g., top five users for each team). The server 13 calculates an obtainment ratio, that is, a ratio of the total value of accumulated points of the top distributing users to the total value of accumulated points of all of the distributing users participating in the event. The server 13 evaluates each team based on the total value of accumulated points and the obtainment ratio of the team to determine whether the team wins or loses. Information indicating whether the team wins or loses corresponds to evaluation information.

In the period of the team match event, the distributing user 100 views videos of other distributing users 100 belonging to the same team and issues display requests 105 of a gift object. This activates communication between the distributing users 100. A viewing user 102 who does not belong to a team views a video of his or her favorite distributing user 100. The viewing user 102 issues a display request of a gift object or views a video of another distributing user 100 in the team to which the favorite distributing user 100 belongs. This creates an opportunity for the distributing user 100 and the viewing user 102 to view a video of a new distributing user 100.

An example of transition of the views displayed in the user device 12 in the team match event will now be described with reference to FIGS. 5 to 10.

Figure 5:
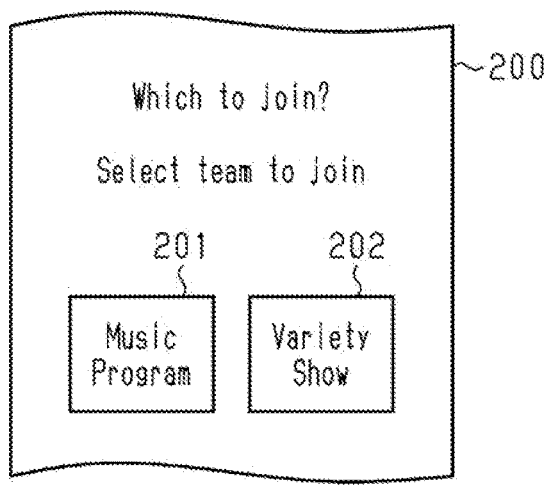
FIG. 5 is an event participation view displayed on the user device in the first embodiment.

As shown in FIG. 5, an event participation view 200 is displayed on the user device 12. The event participation view 200 is displayed by selecting, for example, a banner of the team match event displayed in the view when running the video application program. The event participation view 200 displays a selection button 201 for selecting one team and a selection button 202 for selecting the other team. When a distributing user selects one of the selection buttons 201 and 202, the user device 12 sends an event participation request including information of the selected team to the server 13. The server 13 registers information of the distributing user to the event information 32F based on the received event participation request. The server 13 may have an upper limit on the number of people who belong to one team. For example, when the number of participants in the team reaches the upper limit, the displaying of the event participation view 200 is disabled.

Figure 6:
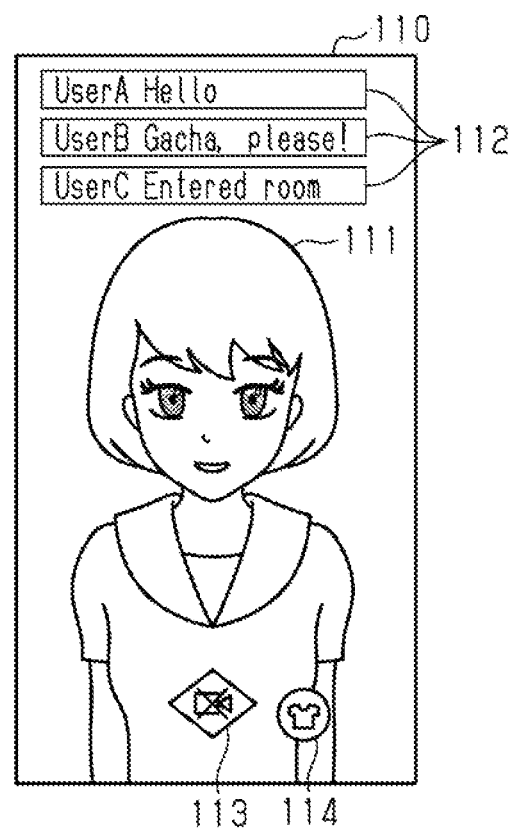
FIG. 6 is an example of a view displayed on the user device in the first embodiment.

FIG. 6 is a video view 110 displayed on the user device 12 of the distributing user. The face of an avatar object 111 changes in accordance with changes in expressions of the distributing user. The head of the avatar object 111 moves in accordance with motion of the head of the distributing user. The position of the avatar object 111 changes in accordance with the relative distance between the distributing user 100 and the sensor unit 24. The video view 110 displays messages 112 posted from the viewing users for a predetermined period. The video view 110 also displays a message 112 output from the server 13 in accordance with an event that occurs during distribution of the video. When detecting an event such as a viewing user starting to view or issuing a display request of a gift object, the server 13 displays a message 112 indicating, for example, "Entered room" in the video view 110. Also, the server 13 displays a message 112 indicating, for example, "Hat Sent" with the account name of the user in the video view 110. In addition, the video view 110 displays a distribution switch button 113 and a possession list view button 114. The distributing user selects the distribution switch button 113 to start to distribute a video or stop distributing the video. The distributing user may select the possession list view button 114 to display the list of objects configured to be displayed in the video based on the possession list information 32D. The distributing user may select an object from the list and display the selected object in the video.

Figure 7A:
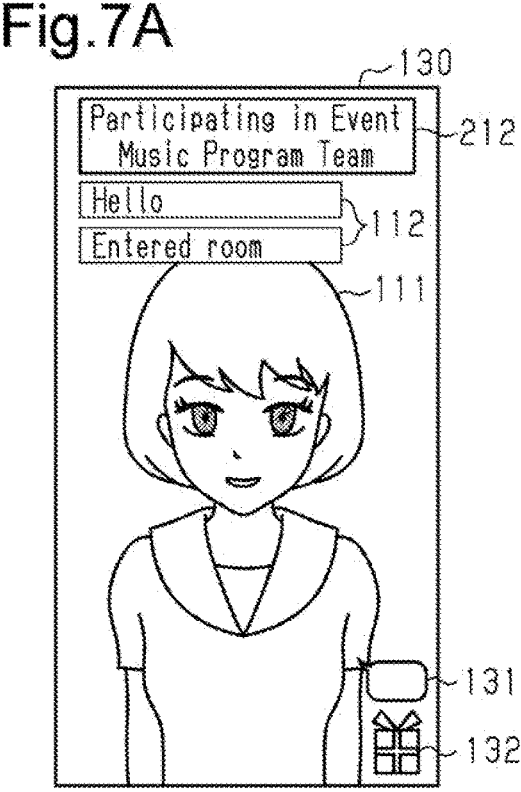
FIGS. 7A to 7C are examples of view transition displayed on the user device in the first embodiment.
Figure 7B:
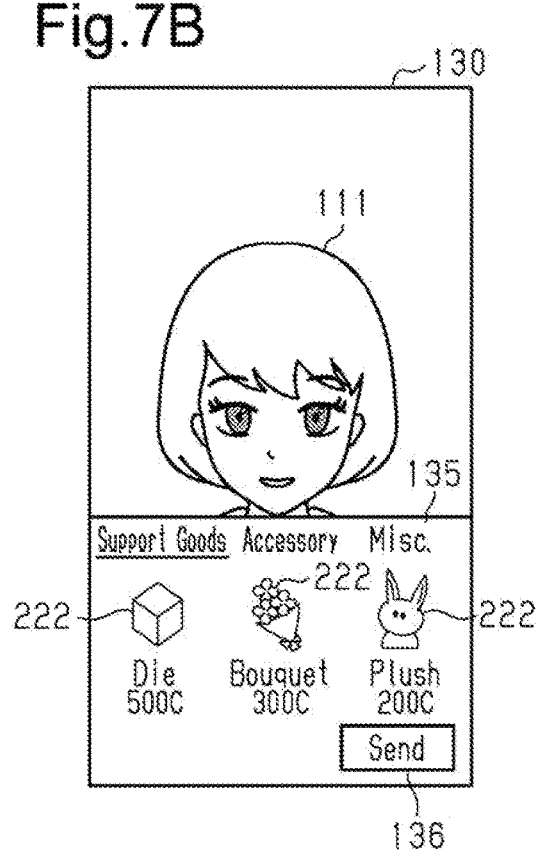
Figure 7C:

FIGS. 7A to 7C are viewing views 130 displayed in the user device 12 of the viewing user. The viewing view 130 is displayed by selecting one video from a video distribution list.

As shown in FIG. 7A, the viewing view 130 includes the avatar object 111, a message posting button 131 and a gift button 132. When the viewing user selects the message posting button 131, an entry field is displayed. When the viewing user inputs a message to the entry field, the message 112 is displayed in the viewing view 130. When the viewing user selects the gift button 132, a list is displayed in the view based on the possession list information 32D. When the distributing user is participating in the team match event, team identification information 212 is displayed in the viewing view 130. The team identification information 212 is, for example, a banner indicating the name of the team in which the distributing user is participating. When supporting a particular team, the viewing user refers to the team identification information 212 to view a video of the supporting team.

FIG. 7B is a viewing view 130 displayed when the gift button 132 is selected. The viewing view 130 displays a gift list 135. The gift list 135 displays gift objects in each category. In FIG. 7B, the gift list 135 displays normal objects 222 included in the gift object information 32E. The gift objects displayed in the gift list 135 include an attachment object and an effect object. When the viewing user selects a normal object or an effect object and selects an enter button 136, a display request including identification information of the object is sent from the user device 12 to the server 13 and the object is displayed in the video. At this time, the purchase processor 30C of the server 13 subtracts predetermined coins or points from the coins or points in the user management information 32C in accordance with the selected object. When the viewing user selects an attachment object, a display request including identification information of the object is sent from the user device 12 to the server 13. The identification information of the gift object is stored in the possession list information 32D of the distributing user distributing the video. When the viewing user issues a display request of an object, the video displays a message notifying that the object is sent.

FIG. 7C is a viewing view 130 including the normal objects 222 and an effect object 223. The server 13 stores the accumulated points in the event information 32F in accordance with a gift object requested to be displayed by the viewing user. When an attachment object is requested to be displayed and the distributing user selects the attachment object, the avatar object 111 wearing the attachment object is displayed. Alternatively, the attachment object may be automatically attached to the avatar object 111 and displayed in the order of the display request issued by the viewing user.

Figure 8:
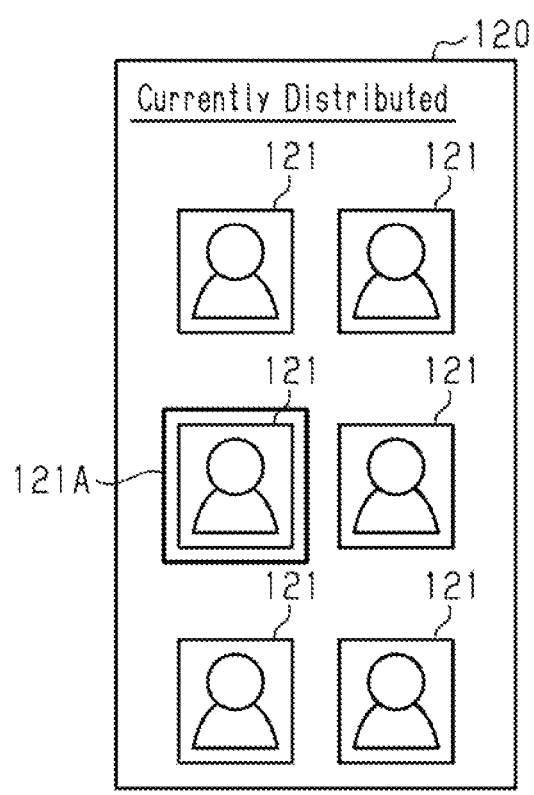
FIG. 8 is a video distribution list in the first embodiment.

FIG. 8 is a video distribution list view 120 displayed after the team match event ends. The video distribution list view 120 displays thumbnail images 121 indicating video channels that are distributed live. When a video is being distributed by a distributing user who belonged to the team that won in the team match event, an indication 121A is displayed to be distinguished from a normal thumbnail image 121. The indication 121A is, for example, a gold frame. When the distributing user who won in the team match event is displayed in a distinguishable manner as described above, the degree of attention of the viewing users to the video of the distributing user is increased, so that the effect of attracting users to the video is increased.

After the team match event ends, the distribution manager 30A of the server 13 determines a rank of a viewing user who requested to display a gift object based on the gift object information 32E and displays the rank in the display device 28 of the user device 12. The rank may be determined based on the number of display requests of a gift object or may be determined based on compensation such as coins or points needed when the viewing user purchases a gift object.

Figure 9:
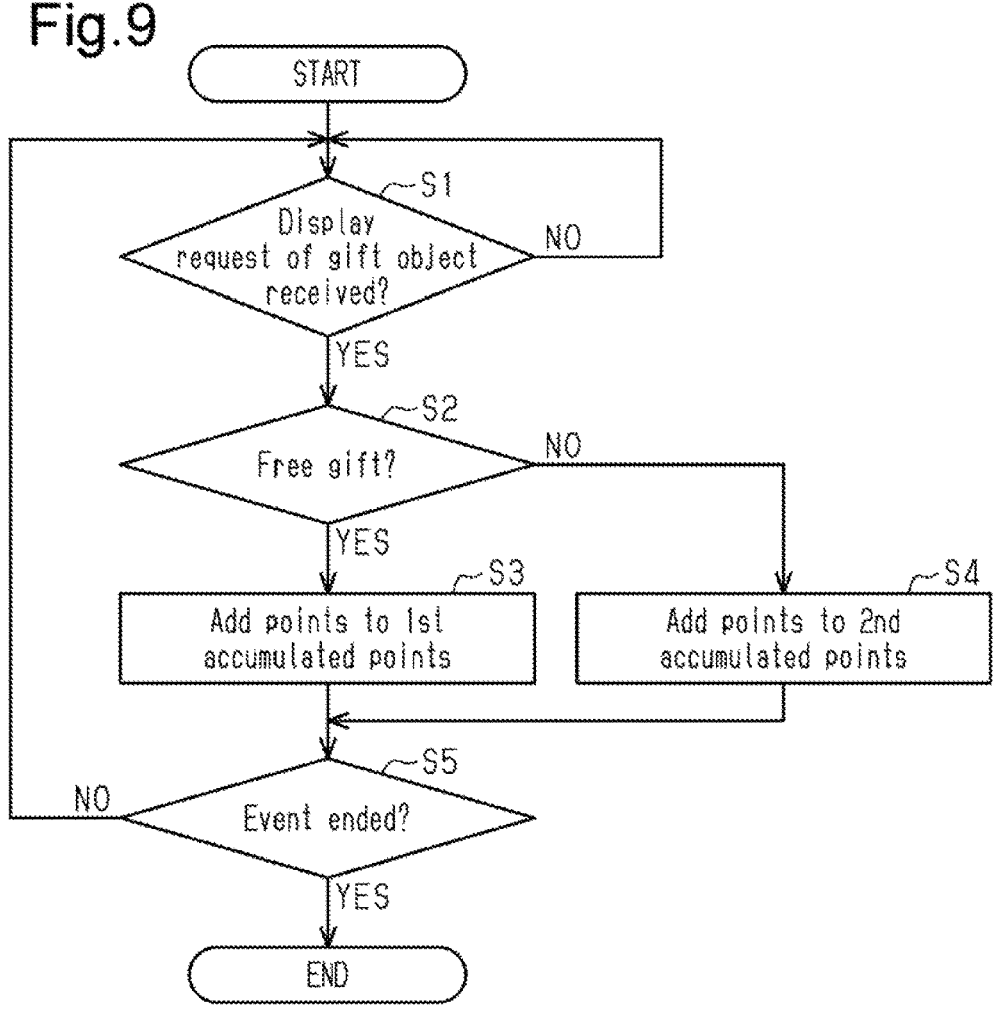
FIG. 9 is a flowchart showing the procedures for calculating accumulated points in the team match event of the first embodiment.
Figure 10:
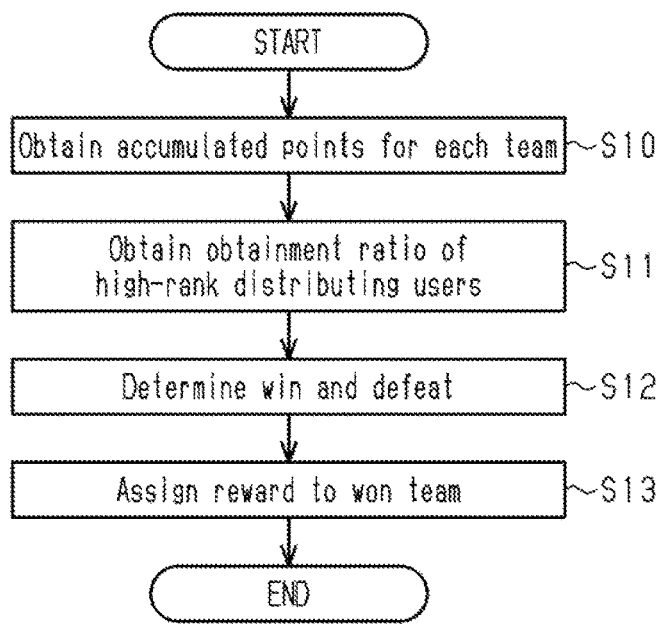
FIG. 10 is a flowchart showing the procedures for determining win and defeat in the team match event of the first embodiment.

With reference to FIGS. 9 and 10, operations of the user device 12 and the server 13 will now be described along the procedures of processes executed in the video application program.

The procedures of a team match event process executed by the server 13 will now be described with reference to FIG. 9. For each video distributed during the period of the event, the distribution manager 30A determines whether a display request of a gift object is received from the user device 12 of the viewing user (step S1). When it is determined that the display request of a gift object is not received (step S1: NO), the distribution manager 30A continues to wait for receiving the display request.

When it is determined that the display request of a gift object is received (step S1: YES), the distribution manager 30A determines whether the gift object of the display request is an object (free gift object) corresponding to a free gift, which is free of compensation such as coins (step S2). When it is determined that the gift object of the display request is a free gift object (step S2: YES), the distribution manager 30A adds points corresponding to the free gift to the first accumulated points in the event information 32F associated with the distributing user distributing the video (step S3). When it is determined that the gift object of the display request is an object (paid gift object) corresponding to a paid gift (step S2: NO), the distribution manager 30A adds points corresponding to compensation for the paid gift to the second accumulated points in the event information 32F (step S4).

The distribution manager 30A determines whether the team match event has ended (step S5). When it is determined that the team match event has not ended (step S5: NO), the distribution manager 30A returns to step S1 and repeats the above process for each video distributed during the period of the event.

A process for determining win and defeat in the team match event will now be described with reference to FIG. 10. The distribution manager 30A obtains the accumulated points for each team based on the event information 32F (step S10). In this step, the first accumulated points and the second accumulated points of each team are obtained.

Also, the distribution manager 30A calculates the point obtainment ratio of the top distributing users based on the event information 32F (step S11). More specifically, a first total value and a second total value are calculated. The first total value is a total value of the first accumulated points and the second accumulated points of all of the distributing users. The second total value is a total value of the first accumulated points and the second accumulated points of the top distributing users in each team. The obtainment ratio, that is, the ratio of the second total value to the first total value, is calculated for each team.

The distribution manager 30A determines win and defeat based on the first accumulated points and the obtainment ratio calculated in step S11 of each team (step S12). For example, the distribution manager 30A may add the accumulated points and the obtainment ratio of each team and determine that a team having the higher added value wins. The distribution manager 30A may multiply at least one of the accumulated points and the obtainment ratio of each team by a coefficient before adding them.

The distribution manager 30A assigns a reward to the winning team (step S13). More specifically, the distribution manager 30A displays the thumbnail image of a distributing user who belonged to the winning team in a manner distinguishable from other distributing users in the distribution list.

The advantages of the present embodiment will now be described.

(1) The winning team is determined based on the points corresponding to a display request of an object. This creates an opportunity for the distributing users belonging to a group to cooperate with each other. Thus, interaction between the distributing users is enhanced. A group supported by a viewing user may include an "unviewed video distributing user," that is, a distributing user distributing videos any of which have not been viewed by the viewing user. Since the opportunity is created for the viewing user to view a video distributed by such an unviewed video distributing user, chances of viewing the video are increased. This may increase the length of time a video is viewed, the number of viewing users, and the number of times the video is viewed.

(2) The video distribution list displays the indication 121A for recognizing that the video belongs to the winning team. The viewing user may refer to the indication 121A when selecting a video to view. When the video distribution list displays the indication 121A, the degree of attention to the video having the indication 121A is increased. An increase in the number of viewing users is expected. This increases motivation of the distributing user for winning in the team match event.

(3) The predetermined points are accumulated for each group in accordance with a display request of a free object. The distributing user shows a performance such that the video obtains a lot of free gift objects. This activates the video distribution service.

(4) The predetermined points are accumulated for each group in accordance with a display request of a paid object. The distributing user distributes a performance such that the video obtains a lot of valuable gift objects. This activates the video distribution service.

(5) The video view displays the group of a distributing user in an identifiable manner. This allows the viewing user to readily select a video of a distributing user who belongs to the supporting group.

A second embodiment of a video distribution system will now be described with reference to FIGS. 11 to 17.

Figure 11:
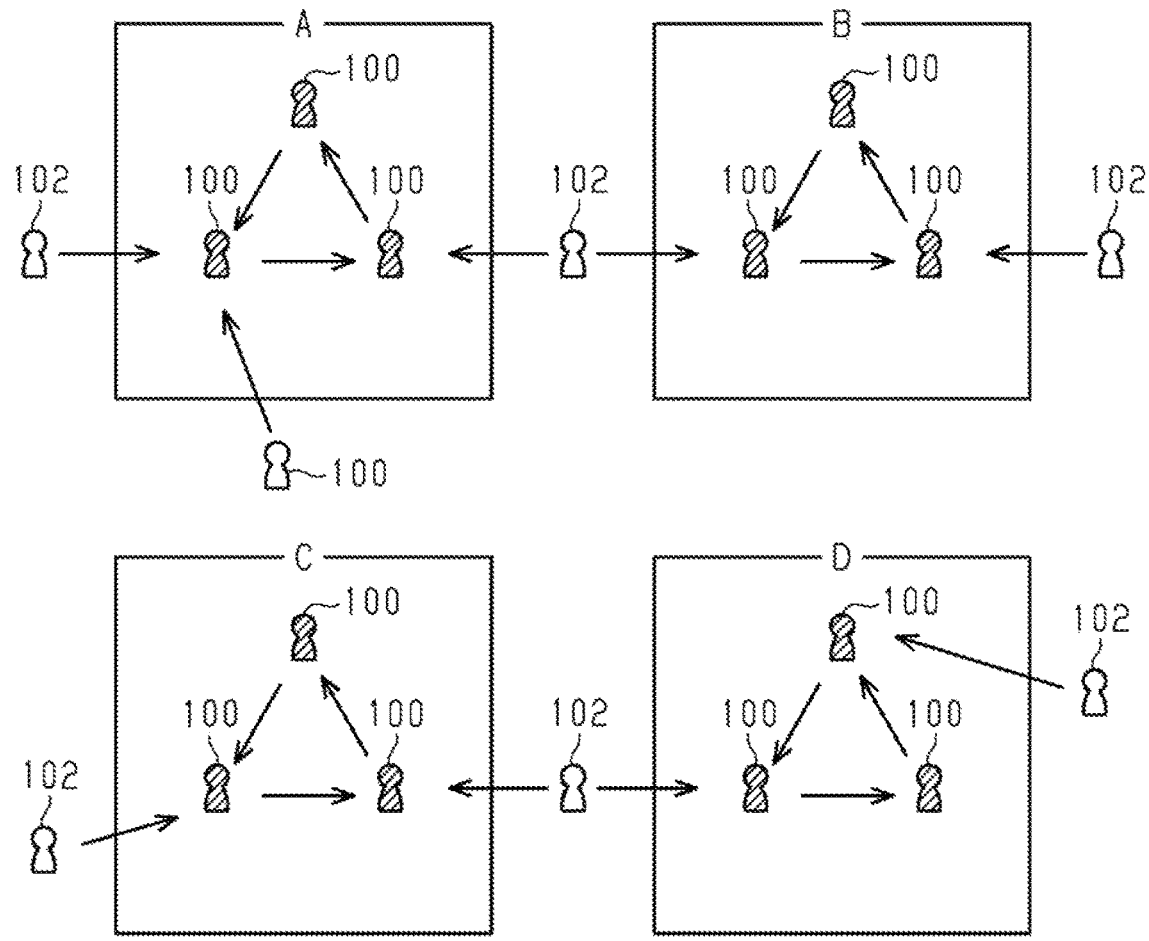
FIG. 11 is a schematic diagram illustrating an event in a second embodiment.

The team match event in the video distribution service will now be described with reference to FIG. 11. A distributing user 100 participating in the team match event belongs to one of the four teams "A" to "D." A viewing user 102 who views a video selects a video of a distributing user to view the selected video as indicated with an arrow in FIG. 11. Also, the distributing user 100 may act as a viewing user who views videos distributed by other distributing users 100 to view the videos of the distributing users 100.

In the team match event, the four teams are evaluated in accordance with parameters of three different evaluation axes, that is, a parameter related to the length of viewing time for each team (first evaluation axis), a parameter related to the number of distribution days (second evaluation axis), and accumulated points based on gift objects (the third evaluation axis). The parameter related to the length of viewing time is an average of the length of viewing time in the event information 32F corresponding to the distributing users belonging to the team. The average of the length of viewing time is calculated by, for example, adding the length of viewing time of all of the distributing users belonging to the team and dividing the added value by the number of distributing users. When calculating the average of the length of viewing time, the length of viewing time of a distributing user may be omitted if the length of viewing time in the event information 32F is less than one minute.

The number of distribution days is an average of distribution days in the event information 32F corresponding to the distributing users belonging to the team. The average of distribution days is calculated by, for example, adding the distribution days of all of the distributing users belonging to the team and dividing the added value by the number of distributing users. When calculating the average of distribution days, the distribution days of a distributing user may be omitted if the distribution days in the event information 32F is less than one day.

The accumulated points are calculated based on the first accumulated points and the second accumulated points in the event information 32F corresponding to the distributing users belonging to the team. The accumulated points are calculated in accordance with, for example, an expression such as "first accumulated points+second accumulated points×10."

Since the units differ between the evaluation axes, a rank is determined for each evaluation axis, and points are assigned in accordance with the rank. In an example, for each evaluation axis, forty points are assigned to the team in the first place. Thirty points are assigned to the team in the second place. Twenty points are assigned to the team in the third place. Ten points are assigned to the team in the fourth place. The points obtained from each evaluation axis are added, and the rank is determined based on the amount of the added points. The points assigned based on each evaluation axis correspond to a first value, a second value, and a third value.

A distributing user who contributes to the winning of the team by increasing the parameter related to the length of viewing time of the team and the parameter related to the number of distribution days is not limited to a distributing user who has a lot of fans. Even a new user who has just stated distributing a video or a user who has a few repeaters may contribute to winning of the team by at least increasing the number of distribution days or viewing a video of a distributing user belonging to the same team to increase the length of viewing time. The team match event triggers to promote users to view videos of the users belonging to the same team and creates an opportunity to view a video of a new distributing user, that is, a distributing user distributing a video that has not been viewed before. A team having high accumulated points has a tendency to include a distributing user having a lot of fans or a relatively large number of distributing users having fans.

The distributing user 100 participating in the team match event may transfer from the belonging team to another team during the period of the event. For example, a distributing user 100 belonging to team A may leave team A and newly belong to team B. At this time, the length of viewing time, the number of distribution days, the first accumulated points, and the second accumulated points that are added to the event information 32F associated with team A by distributing a video of the distributing user 100 while belonging to team A are reset. In addition, since the distributing user 100 starts to belong to team B, the length of viewing time, the number of distribution days, the first accumulated points, and the second accumulated points obtained by distributing a video of the distributing user 100 are added to the event information 32F associated with team B. That is, the length of viewing time, the number of distribution days, the first accumulated points, and the second accumulated points of the distributing user 100 when belonging to team A cannot be carried over to team B.

An example of transition of the views displayed in the user device 12 in the team match event will now be described with reference to FIGS. 12 to 16.

Figure 12:
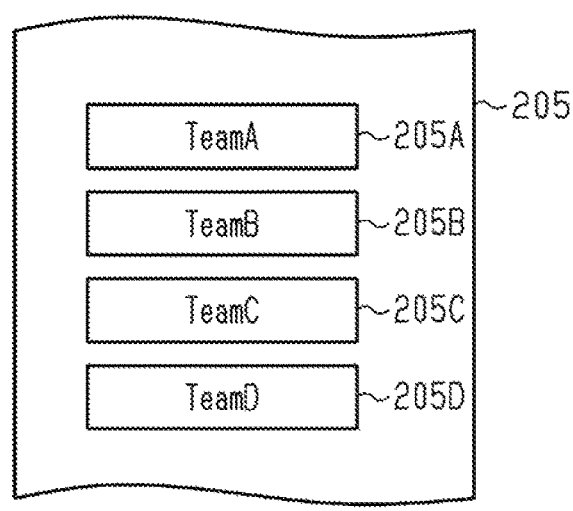
FIG. 12 is an event participation view displayed on a user device in the second embodiment.

As shown in FIG. 12, an event participation view 205 is displayed on the user device 12. The event participation view 205 is displayed by selecting, for example, a banner of the team match event displayed in the view when running the video application program. The event participation view 205 displays selection buttons 205A to 205D for selecting each team. When a user selects one of the selection buttons 205A to 205D, the user device 12 sends an event participation request including information of the selected team to the server 13. The server 13 registers information of the user to the event information 32F based on the received event participation request. The server 13 may have an upper limit on the number of people who belong to one team. For example, when the number of participants in the team reaches the upper limit, the displaying of the event participation view 205 is disabled.

Figure 13:
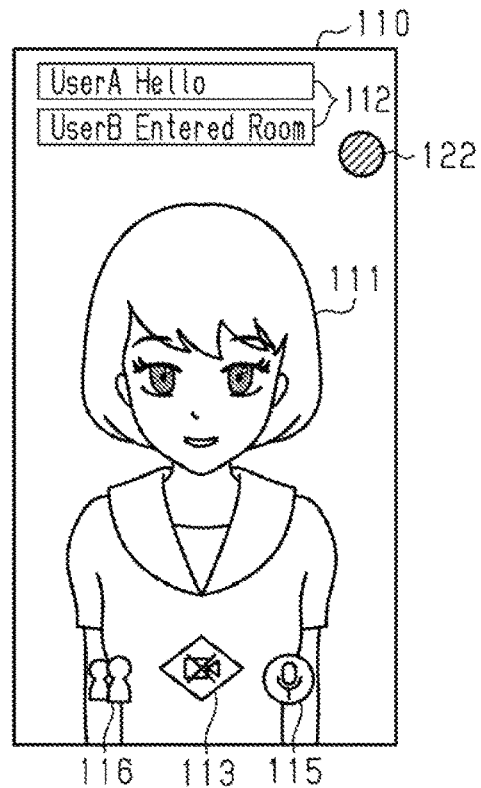
FIG. 13 is an example of a video view displayed on the user device in the second embodiment.

FIG. 13 is a video view 110 displayed on the user device 12 of the distributing user. The video view 110 may display a team identification indication 122 of the team to which the distributing user belongs in addition to the avatar object 111 and the message 112. The team identification indication 122 is an image that differs in color or shape between teams.

The video view 110 also displays a sound switch button 115 and a collaboration distribution button 116 in addition to the distribution switch button 113. The distributing user operates the sound switch button 115 to switch between activation and deactivation of distribution of a sound. The distributing user selects the collaboration distribution button 116 to see the status of the collaboration distribution. In the collaboration distribution, voice of the viewing user reflects the video that is being viewed. The collaboration distribution button 116 is displayed only when the distributing user permits the feature of the collaboration distribution. When the distributing user selects the collaboration distribution button 116, identification information of the viewing user whose voice is reflecting and a button for instructing to end the collaboration distribution are displayed.

Figure 14:
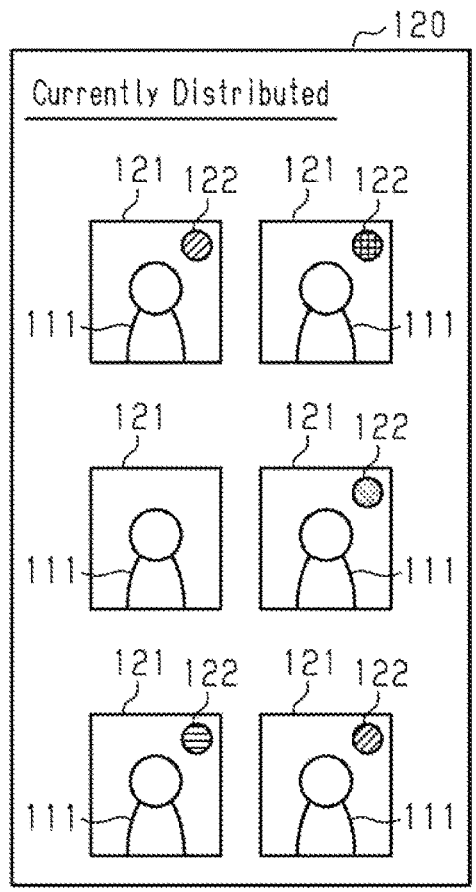
FIG. 14 shows an example of a video distribution list displayed on the user device in the second embodiment.

FIG. 14 is the video distribution list view 120 displayed on the display device 28 of the user device 12 when the video application is in the viewing mode during the period of the event. The video distribution list view 120 displays thumbnail images 121 indicating video channels that are distributed live. The team identification indication 122 is displayed on the thumbnail image 121 corresponding to a video distributed by a distributing user belonging to a team so that the team of the distributing user is identified. The team identification indication 122 is not displayed on the thumbnail image 121 corresponding to a video of a distributing user who does not belong to a team. In the video distribution list view 120, the team identification indication 122 allows the viewing user to identify a distributing user belonging to the team that the viewing user wishes to support and view the video of the distributing user.

Figure 15A:
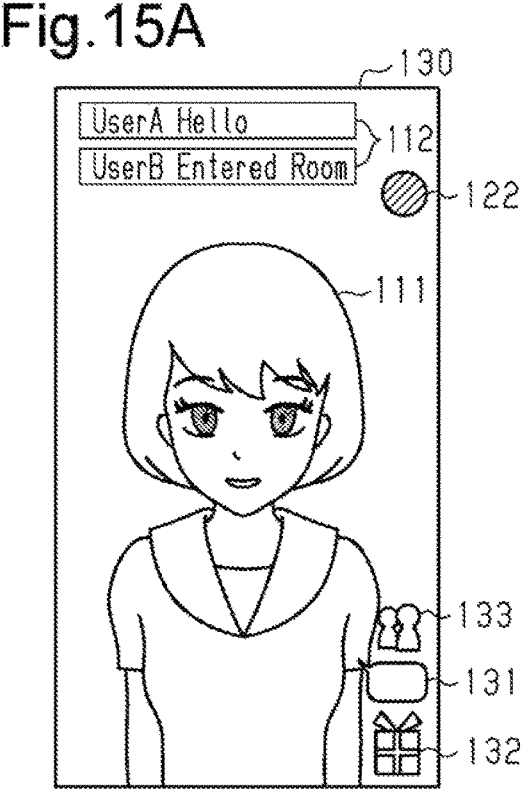
FIGS. 15A to 15C are a video view, a viewing view when a gift button is operated, and a viewing view displaying gift objects that are displayed on the user device in the second embodiment.

As shown in FIG. 15A, the viewing view 130 includes a collaboration distribution button 133 in addition to the avatar object 111, the message posting button 131, and the gift button 132. In addition, the viewing view 130 may display the team identification indication 122. The message 112 includes a message posted by the viewing user, a message posted from another viewing user, and a message automatically posted from the server 13 based on an action of a viewing user such as "Entered room" or "Sent bouquet."

When the viewing user selects the collaboration distribution button 133, a collaboration request is sent from the user device 12 of the viewing user to the server 13. The server 13 sends the collaboration request to the user device 12 of the distributing user. When the distributing user operates to accept the collaboration request, the server 13 reflects sound transmitted from the user device 12 of the viewing user in the video.

Figure 15B:
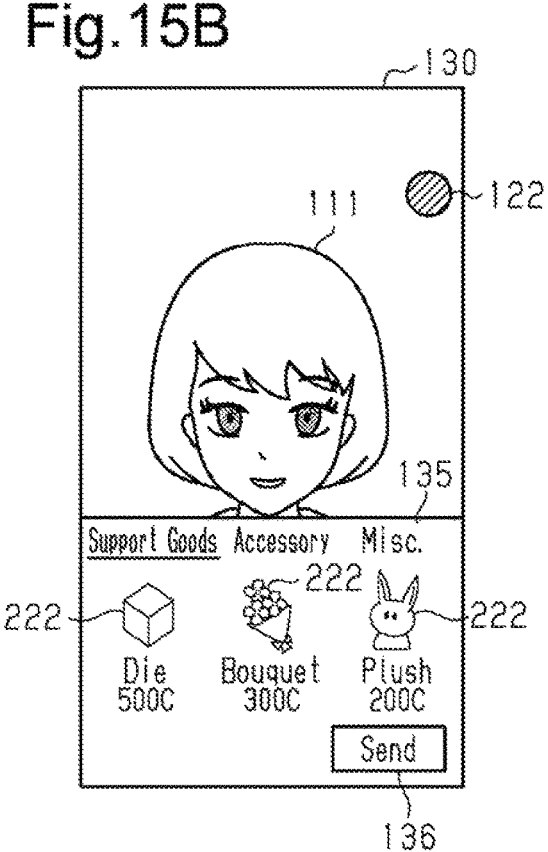

FIG. 15B is a viewing view 130 displayed when the gift button 132 is selected. The viewing view 130 displays the team identification indication 122 in addition to the gift list 135 and the enter button 136.

Figure 15C:
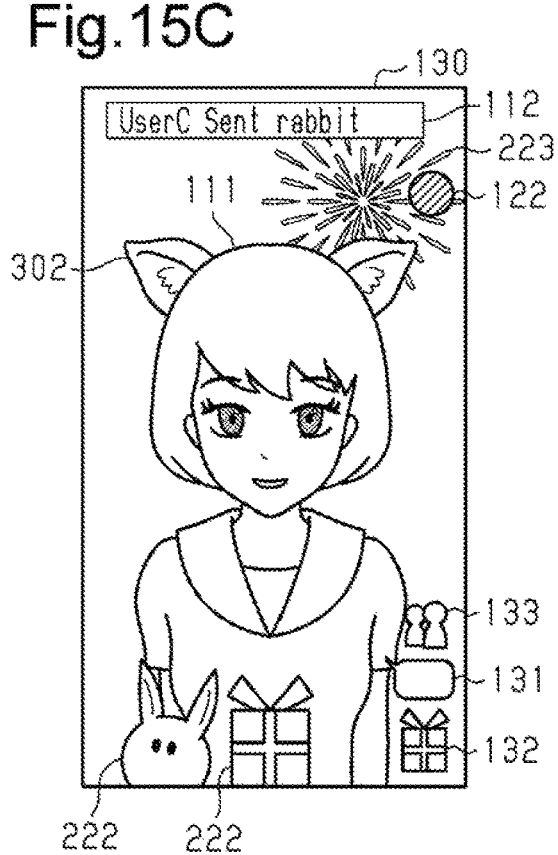

FIG. 15C is a viewing view 130 in which gift objects are displayed. The viewing view 130 displays the normal objects 222 such as a rabbit plush, the effect object 223 such as firework, and an attachment object 302 such as cat ears. The server 13 stores the accumulated points in the event information 32F in accordance with a gift object requested by the viewing user to be displayed.

Figure 16:
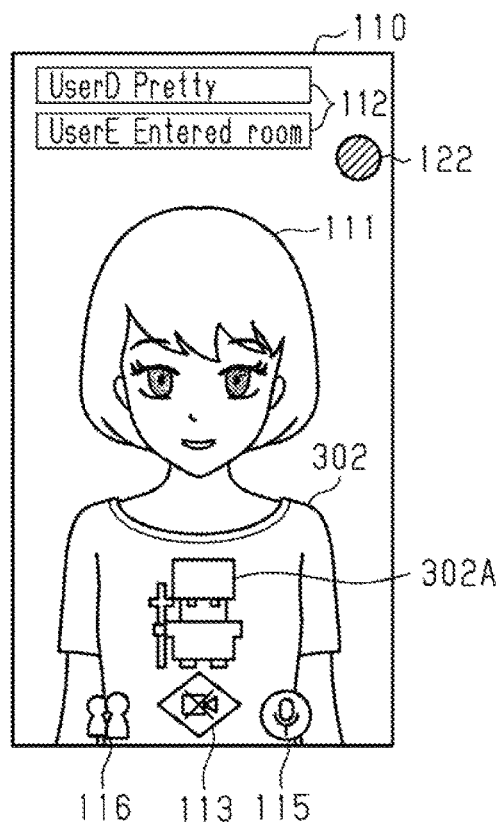
FIG. 16 is an example of a video view displayed after an event in the second embodiment.

FIG. 16 is a view displayed based on the result of the event after the event ends. For example, a common attachment object 302 is assigned to the distributing users belonging to the team in the first place of the event. Information of the assigned attachment object 302 is registered to the possession list information 32D. The attachment object 302 is, for example, a T-shirt and has a common color or shape. The T-shirt shows an image that identifies the team such as the same pattern or the team logo. FIG. 16 shows an attachment object 302 including an image 302A that identifies the team.

Among the distributing users belonging to teams in places other than the first place of the event, the attachment object 302 is assigned to a user having a high evaluation for the three evaluation axes and a user having a high evaluation for one evaluation axis within the team. For example, ranks are determined within the team based on each of the three evaluation axes, and points are assigned in accordance with the ranks. The attachment object 302 is assigned to top users having high total points. Alternatively, the attachment object 302 is assigned to top users having high accumulated points based on the display request of a gift object.

As described above, when the common attachment object is assigned to the users as a reward of the event, a sense of togetherness of the users is increased so that, for example, the users wearing the same attachment object perform a collaboration distribution. This activates communication between the users.

Figure 17:
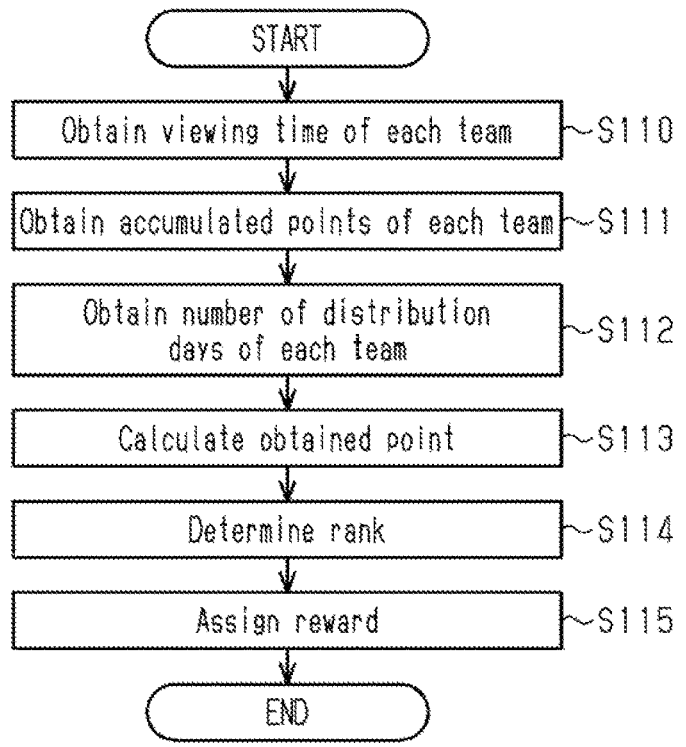
FIG. 17 is a flowchart showing the procedures for determining a rank based on different evaluation axes in an event of the second embodiment.

A process for determining win and defeat in the team match event will now be described with reference to FIG. 17. The distribution manager 30A obtains the length of viewing time of each team (step S110). More specifically, for each team, the distribution manager 30A obtains the length of viewing time of the users belonging to the team and calculates an average of the length of viewing time. The distribution manager 30A also obtains the accumulated points of each team (step S111). At this time, the distribution manager 30A calculates the accumulated points in accordance with, for example, an expression such as "first accumulated points+second accumulated points×10." The distribution manager 30A also obtains the number of distribution days of each team (step S112). More specifically, an average of the number of distribution days is calculated by adding the number of distribution days of the users belonging to the team and dividing the added value by the number of users.

The distribution manager 30A calculates the obtained points of each team based on the length of viewing time, the accumulated points, and the number of distribution days (step S113). More specifically, the distribution manager 30A determines a rank based on the length of viewing time of each team and assigns points to the team in accordance with the rank. The distribution manager 30A also determines the rank based on the accumulated points of each team and assigns points to the team in accordance with the rank. The distribution manager 30A also determines a rank based on the number of distribution days and assigns points to the team in accordance with the rank. The distribution manager 30A adds the points that are assigned in accordance with the rank of each evaluation axis to calculate the obtained points of each team.

Next, the distribution manager 30A determines the rank based on the obtained points (step S114). The distribution manager 30A assigns a reward to the users based on the rank (step S115). More specifically, a common attachment object is assigned to all of the users belonging to the team in the first place. In addition, an attachment object is assigned to a user having a high rank within a team based on the evaluation axes.

The advantages of the present embodiment will now be described.

(6) Points are assigned to each team to which a distributing user belongs based on the first evaluation axis related to the length of viewing time and the second evaluation axis related to the distribution state, and the team is ranked based on the points. A distributing user may view a video of another distributing user to increase the length of viewing time, thereby contributing to the team. Also, the distributing user may continuously distribute a video, thereby contributing to the team. The ranking of the teams includes an element related to cooperation of the users and an element related to effort of individual users so that the rank of a team may be increased without depending on the number of fans of a distributing user and experiences of distributing videos. Thus, even a distributing user who is a beginner or a distributing user having a few fans may contribute to the rank of the team. Such a distributing user participates in the team match event without hesitation. This activates the entire video distribution system.

In the video distribution system described above, a distributing user distributing a video may become a viewing user who views a video of other distributing users. When interaction between the distributing users is activated, it is expected that interaction is consequently activated in the entire video distribution system. Activation of interaction in the entire video system may increase the length of viewing time of a video, the number of viewing users, and the number of times a video is viewed.

(7) The teams are ranked based on the third evaluation axis related to a request to display a gift object in a video in addition to the first evaluation axis related to the length of viewing time and the second evaluation axis related to the distribution state. The distributing users belonging to the team may issue a request to display a gift object to each other, thereby contributing to the ranking of the team.

(8) The rank of the team is determined based on each evaluation axis, and points are assigned to the team in accordance with the rank. Thus, while the evaluation axes have different units, the evaluations based on the multiple evaluation axes are taken into consideration when determining the rank.

(9) The same attachment object is assigned to the distributing users belonging to the same team in accordance with the rank. This increases a sense of togetherness of the distributing users, thereby increasing opportunities for a distributing user to view videos of other distributing users.

(10) The video distribution list is displayed so that the team of a distributing user is identifiable. Thus, the viewing user readily selects a video of the supporting team.

The embodiments may be modified as follows. The embodiments and the following modifications can be combined as long as the combined modifications remain technically consistent with each other.

In the embodiments, the video distribution system is a system in which a distributing user distributes a video including an animation of an avatar object corresponding to the distributing user. Instead, the video distribution system may be a system that distributes a video that does not include an animation of the avatar object corresponding to the distributing user and allows a viewing user to participate in. For example, a distributing user may distribute a video of a game that the distributing user plays. When a player character corresponding to the distributing user exists, the player character may be or may not be displayed in the video of the game. The player character does not have to exist in the game. The content of the game is not particularly limited. For example, the game may be, for example, a role-playing game, a shooter game, an action game, a racing game, a fighting game, a social simulation game, a romance simulation game, a puzzle game, a card game, a sports game, and a rhythm game.

A viewing user may use the user device 12 of the viewing user or another device to issue a display request of an image displayed in a video to participate in the video. The other device is a device configured to communicate with the server 13 or the user device 12.

The image requested for display by the display request may be an image of an object in a virtual space of the game, an image of a message, or an image that notifies that viewing has started.

The object may be an object advantageous to progress in the game in addition to the gift objects that are described in the embodiments. The object advantageous to progress in the game is, for example, an item used by the player character such as a weapon, a protective guard, a conveyance, clothes, food, medicine, and currency, an item that changes a parameter such as life (physical strength) of the player character to be advantageous to progress in the game, an item that directly attacks an opponent character without being used by the player character (e.g., missile launched to opponent character), or a character that cooperates with the player character to advance the game.

The object may be an object that is disadvantageous to progress in the game. Such an object may be, for example, an object that hinders movement of the player character, an item that changes a parameter such as life (physical strength) of the player character to be disadvantageous to progress in the game, or an opponent character. The object may be displayed in a display region corresponding to a storeroom or the like associated with the distributing user in addition to or instead of a display region corresponding to the main view in which the game proceeds.

Figure 18:
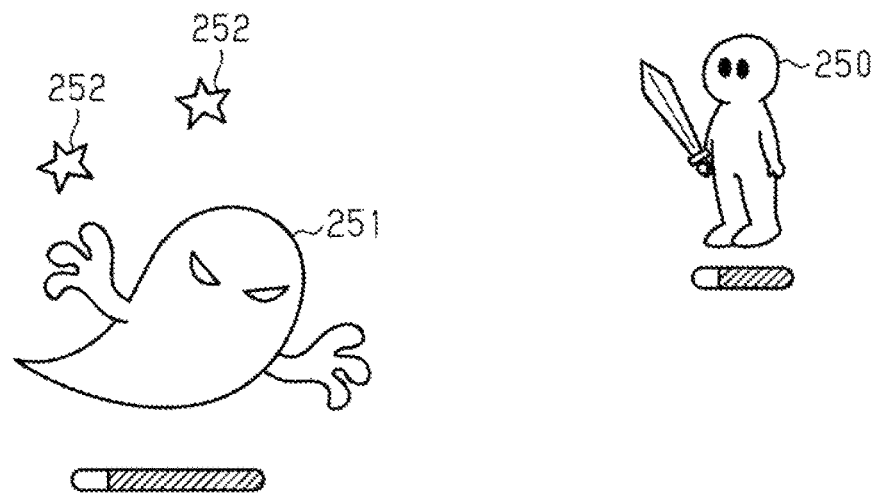
FIG. 18 is an example of a video in a modification.

FIG. 18 is an example of a video that displays a play character 250 that moves based on an input operation of the distributing user and an opponent character 251. The play character 250 performs an action such as a move or an attack in accordance with an input operation of the user. An object 252 is sent from a viewing user to apply damage to the opponent character 251. This configuration also allows the distributing user and the viewing user to cooperate to play the game and enhances interaction between the distributing user and the viewing user.

As described above, even when the viewing user participates in a video by requesting that an image displayed in the video be displayed in the video, the video may be evaluated based on at least one of the number of times the video is viewed, the length of viewing time, the number of times the video is distributed, the length of distribution time, and the number of display requests of an object in the same manner as the embodiments.

The viewing user may participate in a video by requesting that a sound output from the video be output from the video.

The viewing user may be allowed to change various types of parameters associated with the distributing user such as life, attack power, and defense power to be advantageous to progress in the game.

Compensation for participation of the viewing user in the video may or may not be needed.

In the first embodiment, the wining team is determined based on the first accumulated points based on the display request of a free gift object and the obtainment ratio of the top distributing users. The winning team may be determined based on a display request of a gift object. For example, the winning team may be determined based on at least one of the total value of the first accumulated points of each team, the total value of the second accumulated points of each team, the total value of the first accumulated points and the second accumulated points of each team, the ratio of the second accumulated points to the first accumulated points, or the ratio of the first accumulated points to the second accumulated points. The first accumulated points may be added to points obtained by multiplying the second accumulated points by a coefficient (for example, "first accumulated points+10× second accumulated points") for each team and compared to determine the winning team.

In the first and second embodiments, win or defeat of two or four teams in the team match event is determined to evaluate each team. The number of teams may be any plural number. The evaluation of each team is not limited to win or defeat. For example, the evaluation may be based on an evaluation axis such as "the number of free gifts," "the number of paid gifts," and "the total number of gifts." It may be configured not to determine win or defeat. An indication based on this evaluation information may be displayed in the video distribution list. That is, different indications evaluated based on different evaluation axes (parameters) are displayed in the video distribution list.

In the first embodiment, the viewing view including the avatar object displays the team identification information 212 so that the team to which the distributing user belongs is identifiable (FIG. 7A). Instead or in addition, team identification information associated with a thumbnail image of a video may be displayed in the video distribution list displaying a list of videos that are being distributed. For example, team identification information may be a frame surrounding the thumbnail image or an icon (badge). The same attachment object may be attached to avatar objects belonging to the same team so that the team to which the distributing user belongs is identifiable.

In the first embodiment, the reward is presentation of the indication 121A in the video distribution list in a manner allowing for recognition of being belonged to the team that won. In the second embodiment, the reward of the team match event is an attachment object. Instead or in addition, an element of the video distribution service may be assigned to the distributing users who belonged to the winning team. The element includes, for example, a gift object, a medium such as a gem, a coin, or a point, a gacha ticket for lot drawing to select a selectable reward, and a privilege to appear in a real world event. In an event that allows appearance with the event appearance privilege, a video may be distributed to express an aspect of participation in the event using, for example, an avatar object. In addition, a title or a rank usable in the video distribution service may be assigned to the distributing users who belonged to the winning team.

In the first and second embodiments, when the distributing user selects an attachment object, the attachment object is attached to the avatar object. Instead, when viewing users provide attachment objects, the provided attachment objects may be attached to the avatar object in the order of the provision for a predetermined time.

In the first embodiment, a possession object included in the possession list information 32D is configured to be displayed in a video distributed by the user. Instead, an object associated with the user may be usable in a video distributed by the user or another user without distinction between a possession object and a gift object. For example, a distributing user may be allowed to request that a possession object in the possession list information 32D of the distributing user be displayed in a video distributed by another distributing user as a gift object.

In the first embodiment, the avatar object reflecting motion is transmitted from the user device 12 to the server 13. Instead, data detected by the sensor unit 24 may be transmitted to the server 13, and the server 13 may apply the detected data to the avatar data 22B stored in the storage 32.

In the first and second embodiments, the video application program is installed on the user device 12 so that a video is viewed and distributed. Instead, an application program for viewing a video may be separate from an application program for distributing a video. A user who only views a video installs the viewing application program on the user device 12. A user who only distributes a video installs the distribution application program on the user device 12. A user who views and distributes a video installs both of the application programs on the user device 12.

In the first and second embodiments, various types of information stored in the storage 32 of the server 13 such as the asset data 32B, the user management information 32C, the possession list information 32D, the gift object information 32E, and the event information 32F may be stored in the storage 22 of the user device 12.

In the first and second embodiments, the computer processor 20 of the user device 12 or one or more other computers may assume some of the functions in the distribution manager 30A, the video generator 30B, and the purchase processor 30C of the server 13.

In the first and second embodiments, the computer processor 30 of the server 13 or one or more other computers may assume at least some of the functions in the application manager 20A, the motion data generator 20B, and the display controller 20C of the user device 12.

In the first embodiment, each of the movement detector, the movement information transmitting portion, the first display controller, the request sender, the video generator, the group registration portion, the calculation portion, the evaluation portion, the second display controller, and the identification information display may be included in the server 13 or the user device 12. The server 13 may include, for example, the first display controller and the second control display. In this case, the server 13 may obtain detection data of the sensor unit 24 from the user device 12, use the avatar data 22B stored in the storage 32 to generate a video including the avatar object, and display the video in the display device 28 of the user device 12. The user device 12 may include an object display. In this case, the user device 12 may receive a display request including identification information of an object from the server 13 and display the object based on the display request. This corresponds to, for example, when the user device 12 executes a native application of a game installed on the storage 22. When the user device 12 executes the native application, the user device 12 may include the game content assigning portion and the reward assigning portion.

In the first and second embodiments, the virtual space displayed in the video may be a space in an augmented reality (AR) or a mixed reality (MR). For example, the background of the virtual space may be a video of the real world captured by a camera of the user device 12. An image of an avatar object may be composited in the video of the real world.

In the first and second embodiments, the user device 12 is an information processing device such as a smartphone, a mobile phone, a tablet terminal, a personal computer, a game console, and a wearable computer such as a head-mounted display. Instead, the user device 12 may be a system including at least one of the information processing devices, an input device, and an output device. For example, the user device 12 may be a system in which a game console including the computer processor 20 mutually exchanges data with the sensor unit 24, a controller used as the operating OF 27, the speaker 25, and the display device 28 that are provided separately from the game console. The user device 12 may be a system in which an information processing device such as a personal computer mutually exchanges data with the sensor unit 24, a controller used as the operating OF 27, the speaker 25, and a wearable display used as the display device 28 that are provided separately from the information processing device. Alternatively, a user system for distribution may be installed in a studio for distributing a video and include an information processing device, the sensor unit 24, the operating OF 27, the speaker 25, and the display device 28 that are separately provided.

In the first and second embodiments, the user device 12 includes the sensor unit 24. Instead, at least part of the sensor unit 24 may be arranged on the body of the distributing user or in the vicinity of the distributing user. That is, the sensor unit 24 may be separate from the user device 12. For example, the sensor unit 24 may include an emitter that emits detection light such as infrared light at predetermine intervals and a light receiver attached to the body of the distributing user. The light receiver receives the detection light and transmits the detection result to the computer processor 20. Alternatively, the sensor unit 24 may include, for example, a camera that detects a marker attached to the body of the distributing user.

In the second embodiment, the video distribution list displays the team identification indication (refer to FIG. 14) but may display another image. The team identification indication may be a frame surrounding the image of a thumbnail or other images in addition to an image displayed on the thumbnail image. The team identification indication may be an attachment object associated with an avatar object.

Figure 19:
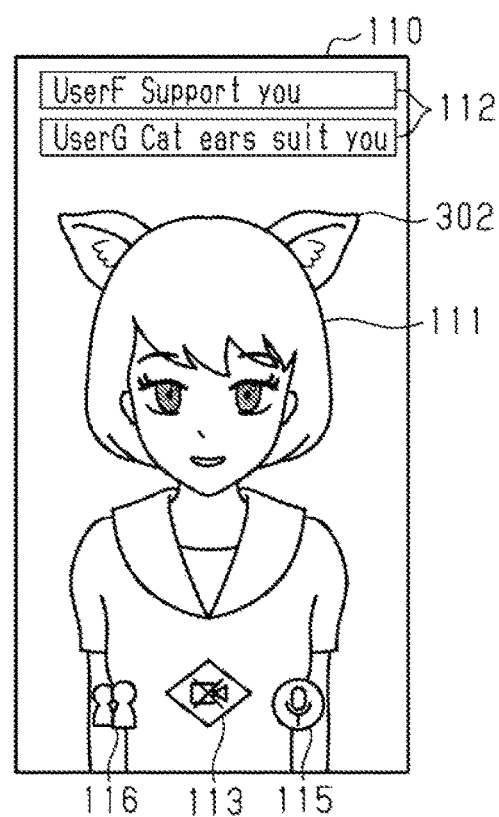
FIG. 19 is an example of a video view displayed in an event in a modification.

As shown in FIG. 19, an attachment object corresponding to the team such as cat ears or rabbit ears is assigned to the distributing user who participated in an event. The distributing user operates the user device 12 to select the attachment object and apply the attachment object 302 to the avatar object to display.

Figure 20:
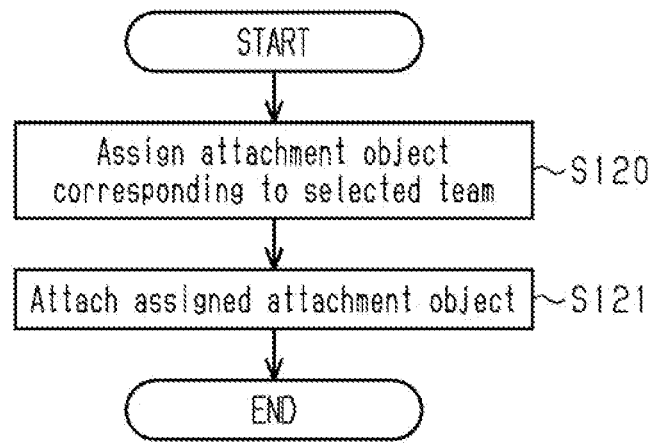
FIG. 20 is a flowchart showing the procedures for assigning a common attachment object during the event in the modification shown in FIG. 19.

Procedures for displaying an attachment object so that the team is identifiable will now be described in accordance with FIG. 20. When the distributing user operates the user device 12 to select a team, an attachment object is assigned in accordance with the selected team (step S120). The server 13 registers the attachment object corresponding to the team to the possession list information 32D of the distributing user. The user device 12 displays the attachment object registered to the possession list information 32D on the display device 28 in accordance with operation of the distributing user.

The distributing user operates the user device 12 to attach the attachment object of each team to the avatar object of the distributing user (step S121). Thus, when a viewing user starts viewing the video, the viewing user recognizes the attachment object of the distributing user and identifies the team to which the distributing user belongs. Selecting of a team by the distributing user may trigger to automatically apply the attachment object to the avatar object of the distributing user. The attachment object corresponding to the team may be included in the possession list information 32D when the video application is installed on the user device 12. The attachment object corresponding to the team does not necessarily have to be attached to the distributing user who participated in an event.

Figure 21:
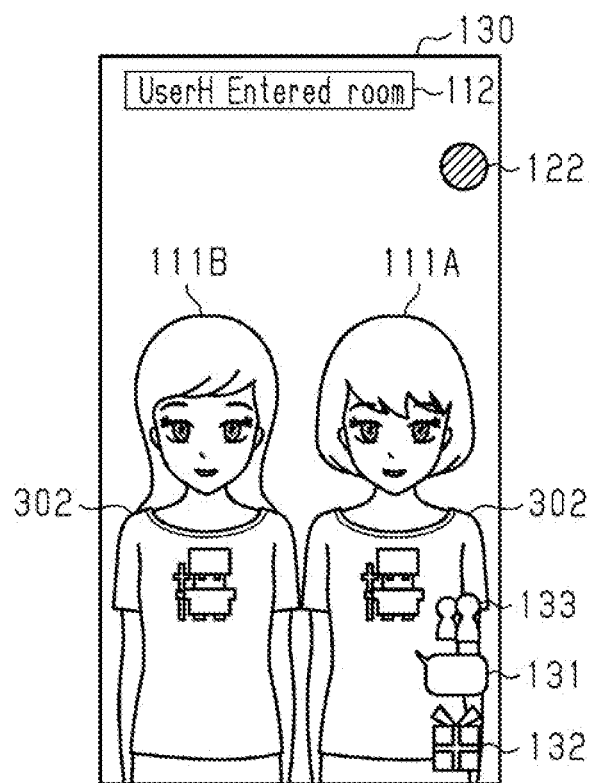
FIG. 21 is an example of a viewing view displayed on a user device in a modification.

As shown in FIG. 21, in the collaboration distribution, an avatar object 111B corresponding to a distributing user who issued a collaboration distribution request may be displayed in the same view as an avatar object 111A corresponding to a distributing user who accepted the request. At this time, the avatar objects 111A and 111B wearing the same attachment object may be displayed. This improves the presentation as compared to a video in another collaboration distribution and expects improvement in at least one of the length of viewing time, the number of viewing users, or the number of times a video is viewed.

In the second embodiment, the motion data is data in which detection data of the sensor unit 24 is applied to the avatar object. Instead, the motion data may be detection data of the sensor unit 24 or data in which detection data is converted into a format applicable to the avatar object in accordance with a predetermined format.

In the second embodiment, the parameter of the first evaluation axis related to the length of viewing time is used as an average of the length of viewing time to evaluate the team. Instead or in addition, the team may be evaluated based on the accumulated total of the length of viewing time of a video distributed by the distributing user belonging to the team, that is, the length of viewing time in the event information 32F. Alternatively, among the lengths of viewing time of the distributing users belonging to the team in a day, the greatest one of the lengths of viewing time may be used to evaluate the team. Any parameter related to the length of viewing time of a video may be used to evaluate the team.

In the second embodiment, the parameter of the second evaluation axis related to the distribution state is used as an average of the distribution days to evaluate the team. Instead or in addition, the team may be evaluated based on another parameter indicating the distribution state such as an average of the length of distribution time or the maximum value of the length of distribution time.

In the second embodiment, the parameter of the third evaluation axis related to the display request of an object is predetermined points corresponding to a gift object. Instead or in addition, the team may be evaluated based on another parameter related to a display request of an object such as the number of display requests of a free gift object, the number of display requests of a paid gift object, or the number of display requests of a predetermined gift object, which is, for example, an attachment object.

In the second embodiment, each of the movement detector, the transmission portion, the display controller, the video distribution portion, the first evaluation portion, the second evaluation portion, the third evaluation portion, the rank determination portion, the assignment portion, the object display, and the list display may be included in the server 13 or the user device 12.

In the second embodiment, the team is evaluated along the first evaluation axis, the second evaluation axis, and the third evaluation axis. Instead, the team may be evaluated along only the first evaluation axis and the second evaluation axis. When the first evaluation axis and the second evaluation axis have parameters having the same unit, for example, the length of viewing time and the length of distribution time may be added so that the team having the largest total value is determined to be in the first place without assigning points based on the rank.

The computer processors 20 and 30 are not limited to one that performs software processing on all processes executed by itself. For example, the computer processors 20 and 30 may include a dedicated hardware circuit (e.g., application specific integrated circuit (ASIC)) configured to perform hardware processing on some of the processes executed by itself. That is, the computer processors 20 and 30 be configured to be circuitry including: 1) one or more processors that operate according to a computer program (software); 2) one or more dedicated hardware circuits that execute at least some of the various processes, or 3) a combination of these. The processor includes a CPU and memory such as RAM and ROM. The memory stores program codes or commands configured to cause the CPU to execute processes. The memory, or a computer readable medium, includes any type of medium that is accessible by a general-purpose computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

As understood from the above disclosure, certain features of the application may be expressed as follows.

A non-transitory computer readable medium that stores a video viewing program, wherein the video viewing program, when executed by circuitry, causes the circuitry to: display, on a display, a list of videos that are being distributed associated with a plurality of groups, a group of the plurality of groups to which a distributing user belongs being displayed as being distinguished from the other groups, the distributing user distributing a first video of the list of videos; responsive to receiving a selection operation to the first video in the list, transmit identification information of the first video to a server; display, on the display, the first video based on video data including an avatar object of the distributing user based on movement information that is based on movement of the distributing user; send a display request to display an object in the first video to the server; and display, on the display, results of win and defeat determined based on a first evaluation based on a length of viewing time of each video for each group, a second evaluation based on a distribution state including at least one of a length of distribution time and a number of distribution days of each video for a predetermined period for each group, and a third evaluation based on the display request with respect to each group.

A video viewing method, the method comprising: by circuitry, displaying, on a display, a list of videos that are being distributed associated with a plurality of groups, a group of the plurality of groups to which a distributing user belongs being displayed as being distinguished from the other groups, the distributing user distributing a first video of the list of videos; by the circuitry, responsive to receiving a selection operation to the first video in the list, transmitting identification information of the first video to a server; by the circuitry, displaying, on the display, the first video based on video data including an avatar object of the distributing user based on movement information that is based on movement of the distributing user; by the circuitry, sending a display request to display an object in the first video to the server; and by the circuitry, displaying, on the display, results of win and defeat determined based on a first evaluation based on a length of viewing time of each video for each group, a second evaluation based on a distribution state including at least one of a length of distribution time and a number of distribution days of each video for a predetermined period for each group, and a third evaluation based on the display request with respect to each group.

A video distributing method, the method comprising: by circuitry, detecting movement of a distributing user that distributes a video; by the circuitry, generating video data including an avatar object of the distributing user based on movement information that is based on the detected movement; by the circuitry, transmitting the generated video data to a user device of a viewing user; by the circuitry, receiving an operation to participate in one of a plurality of groups associated with a plurality of videos including the video distributed by the distributing user; and by the circuitry, displaying a reward based on a ranking that is determined based on a first evaluation based on a length of viewing time of each video for each group and a second evaluation based on a distribution state including at least one of a length of distribution time and a number of distribution days of each video for a predetermined period for each group.

A video distribution system comprising: circuitry, the circuitry is configured to: detect movement of a distributing user that distributes a video; generate video data including an avatar object of the distributing user based on movement information that is based on the detected movement; transmit the generated video data to a user device of a viewing user; receive an operation to participate in one of a plurality of groups associated with a plurality of videos including the video distributed by the distributing user; and display a reward based on a ranking that is determined based on a first evaluation based on a length of viewing time of each video for each group and a second evaluation based on a distribution state including at least one of a length of distribution time and a number of distribution days of each video for a predetermined period for each group.

What is claimed is:

1. A non-transitory computer readable medium that stores a video data processing program, wherein the video data processing program, when executed by circuitry of a user device, causes the circuitry to:

responsive to a selection of a video from a list of videos that are being distributed, display, on a display of the user device, the video based on first video data;

display, on the display, a first group to which a distributing user belongs as being distinguished from other groups, the distributing user distributing the displayed video;

receive an evaluation result of each group from a server based on (i) a first evaluation obtained based on a length of viewing time of each video distributed by each user of each group and (ii) a second evaluation obtained based on a length of distribution time of each video distributed by each user of each group;

display, on the display, the received evaluation result; and receive, from the server, information regarding a reward based on the evaluation result of the first group, and display, in the video distributed after the evaluation of the first group, the reward associated with the distributing user to whom the reward is assigned.

2. The non-transitory computer readable medium according claim 1, wherein the video data processing program further causes the circuitry to:

send an event participation request from the distributing user requesting participating in an event, the event participation request including identification information of a group to which the distributing user belongs;

display, on the display during the event, the video based on the first video data; and responsive to the distributing user starting to distribute the video during the event, display, on the display, the first group.

3. The non-transitory computer readable medium according claim 1, wherein the first video includes an avatar object to which movement information of another user is applied.

4. The non-transitory computer readable medium according claim 3, wherein the reward is an attachment object, the attachment object being associated with a particular part of the avatar object and assigned to each user of the first group, and the video data processing program further causes the circuitry to display the attachment object associated with the particular part of the avatar object of each user belonging to the first group.

5. The non-transitory computer readable medium according claim 3, wherein the reward is an attachment object, the attachment object being associated with a particular part of the avatar object, and different rewards are assigned to users of different groups so that each group can be distinguished from the other groups.

6. The non-transitory computer readable medium according claim 1, wherein the user device comprises a capturing device, and the video data processing program further causes the circuitry to compose the video based on the first video data and second video data of the real world captured by the capturing device, and display the composed video.

7. The non-transitory computer readable medium according claim 1, wherein the video data processing program further causes the circuitry to:

send a display request to display an object in the video, and display the evaluation result, wherein the evaluation result is based on the first evaluation, the second evaluation, and a third evaluation obtained based on the display request with respect to each group.

8. The non-transitory computer readable medium according claim 7, wherein the video data processing program further causes the circuitry to display the object and a message associated with the distributing user.

9. The non-transitory computer readable medium according claim 1, wherein the video data processing program further causes the circuitry to display an indication that indicates a group to which another user belongs.

10. A video data processing method comprising:

by circuitry of a user device, responsive to a selection of a video from a list of videos that are being distributed, displaying, on a display of the user device, the video based on first video data;

displaying, on the display, a first group to which a distributing user belongs as being distinguished from other groups, the distributing user distributing the displayed video;

receiving an evaluation result of the first group from a server based on (i) a first evaluation obtained based on a length of viewing time of each video distributed by each user of each group and (ii) a second evaluation obtained based on a length of distribution time of each video distributed by each user of each group;

displaying, on the display, the received evaluation result; and receiving, from the server, information regarding a reward based on the evaluation result of the first group, and displaying, in the video distributed after the evaluation of the group, the reward associated with the distributing user to whom the reward is assigned.

11. An information processing device communicable with a user device used by a user, the information processing device comprising:

circuitry configured to store the user in association with a first group of a plurality of groups, accumulate a length of viewing time of a video on the user device in association with the first group, accumulate a length of distribution time of the video on the user device in association with the first group, evaluate each group to obtain an evaluation result based on (i) a first evaluation obtained based on the length of viewing time of each video for each group and (ii) a second evaluation obtained based on the length of distribution time of each video for each group, and assign a reward to each user of the first group based on the evaluation result of the first group.

12. A video data processing system comprising:

circuitry configured to:

store a distributing user in association with a first group of a plurality of groups;

responsive to a selection of a video from a list of videos that are being distributed, display the video based on first video data;

display the first group to which the distributing user belongs as being distinguished from other groups, the distributing user distributing the displayed video;

evaluate each group to obtain an evaluation result based on (i) a first evaluation obtained based on a length of viewing time of each video for each group and (ii) a second evaluation obtained based on a length of distribution time of each video for each group;

assign a reward to each user of the first group based on the evaluation result of the first group; and display, in the video distributed after the evaluation of the first group, the reward associated with the distributing user to whom the reward is assigned.

* * * * *